(12) United States Patent
Zimmerman et al.

(10) Patent No.: US 9,802,260 B2
(45) Date of Patent: Oct. 31, 2017

(54) REAMER

(71) Applicant: Kennametal Inc., Latrobe, PA (US)

(72) Inventors: Armin Josef Zimmerman, Nabburg (DE); Robert Meyer, Allersberg (DE); Michael Schuffenhauer, Fürth (DE)

(73) Assignee: KENNAMETAL INC, Latrobe, PA (US)

( * ) Notice: Subject to any disclaimer, the term of this patent is extended or adjusted under 35 U.S.C. 154(b) by 36 days.

(21) Appl. No.: 14/435,495

(22) PCT Filed: Sep. 27, 2013

(86) PCT No.: PCT/US2013/062209
§ 371 (c)(1),
(2) Date: Apr. 14, 2015

(87) PCT Pub. No.: WO2014/062363
PCT Pub. Date: Apr. 24, 2014

(65) Prior Publication Data
US 2015/0266120 A1    Sep. 24, 2015

(30) Foreign Application Priority Data
Oct. 15, 2012   (DE) .......................... 10 2012 020 185

(51) Int. Cl.
*B23D 77/00*   (2006.01)
*B23D 77/02*   (2006.01)

(52) U.S. Cl.
CPC .......... *B23D 77/02* (2013.01); *B23D 2277/02* (2013.01); *B23D 2277/06* (2013.01); *B23D 2277/061* (2013.01); *B23D 2277/30* (2013.01); *B23D 2277/60* (2013.01); *Y10T 408/455* (2015.01); *Y10T 408/78* (2015.01)

(58) Field of Classification Search
CPC ............ B23B 2240/08; B23B 2240/11; B23B 2240/16; Y10T 408/909; Y10T 408/9095; Y10T 408/9097; Y10T 408/78; B23D 77/00; B23D 2277/02; B23D 2277/061
See application file for complete search history.

(56) References Cited

U.S. PATENT DOCUMENTS 1,977,845 A * 10/1934 Emmons ................. B23P 15/32
228/160
3,055,239 A * 9/1962 Andreasson ........ B23B 51/0486
408/226

(Continued)

FOREIGN PATENT DOCUMENTS

CH           433916       4/1967
CN       200995296 Y    12/2007
(Continued)

OTHER PUBLICATIONS

Pro Quest Machine translation of JP 2012-176486, printed Apr. 2017.*

(Continued)

*Primary Examiner* — Daniel Howell
(74) *Attorney, Agent, or Firm* — Ian K. Samways

(57) ABSTRACT

A reamer has a shank made of steel and a cutting body made of a harder material, wherein the cutting body forms the outer circumference of the reamer in the region of the workpiece side end and has all the cutting ribs.

11 Claims, 1 Drawing Sheet

(56) References Cited

U.S. PATENT DOCUMENTS

| | | | | |
|---|---|---|---|---|
| 3,080,777 | A | * | 3/1963 | Lovret ................. B23C 5/1009 408/199 |
| 3,216,107 | A | * | 11/1965 | Andreasson ......... B23D 77/006 407/1 |
| 3,307,243 | A | * | 3/1967 | Andreasson ........ B23B 51/0486 407/11 |
| 3,359,837 | A | * | 12/1967 | Andreasson ............ B23B 51/02 407/11 |
| 3,368,257 | A | * | 2/1968 | Andreasson ........ B23B 51/0486 407/11 |
| 3,543,613 | A | * | 12/1970 | Obloy ................. B23D 77/006 407/11 |
| 3,548,688 | A | * | 12/1970 | Kuch .................... B23B 51/02 403/339 |
| 3,591,302 | A | * | 7/1971 | Andreasson ............ B23B 51/06 408/224 |
| 3,912,414 | A | * | 10/1975 | Fukura ................... B23B 51/02 408/144 |
| 4,166,711 | A | | 9/1979 | Kress et al. |
| 4,383,784 | A | * | 5/1983 | Gulbrandsen ........... B23P 15/32 408/144 |
| 5,580,196 | A | * | 12/1996 | Thompson ............. B23B 51/02 407/119 |
| 6,494,648 | B2 | | 12/2002 | Harpaz |
| 6,499,919 | B2 | * | 12/2002 | Feld ....................... B23B 51/00 408/213 |
| 6,896,450 | B2 | | 5/2005 | Rothenstein |
| 2005/0271890 | A1 | * | 12/2005 | Koecher ................ B23B 51/02 428/615 |
| 2008/0206001 | A1 | * | 8/2008 | Bozkurt ................ B23D 77/00 407/32 |
| 2009/0123244 | A1 | | 5/2009 | Beuttiker et al. |

FOREIGN PATENT DOCUMENTS

| | | | |
|---|---|---|---|
| CN | 101300100 A | 11/2008 | |
| CN | 201833031 U | 5/2011 | |
| CN | 202447724 U | 9/2012 | |
| DE | 2246965 A1 * | 4/1974 | ............ B23B 51/02 |
| DE | 10102697 | 7/2002 | |
| DE | 20300520 U1 | 5/2004 | |
| DE | 69930340 | 10/2006 | |
| DE | 102010036869 | 2/2012 | |
| GB | 705784 A * | 3/1954 | ............ B23B 51/02 |
| GB | 1360221 A * | 7/1974 | .......... B23K 20/129 |
| JP | 2012176486 A * | 9/2012 | |
| NL | 1004625 C2 * | 5/1998 | ............ B23B 51/02 |
| WO | 2007/052250 A2 | 5/2007 | |
| WO | 2014062363 | 4/2014 | |

OTHER PUBLICATIONS

Jun. 12, 2013—Office Action—DE Application No. 1020120201650 and English translation.

Apr. 30, 2015—International Preliminary Report on Patentability—Application No. PCTUS2013062209.

May 11, 2016—First Office Action-English translation—CN2013800535344.

Dec. 26, 2016 Second Office Action.

* cited by examiner

REAMER

CLAIM TO PRIORITY

This application is the National Stage of International Application No. PCT/US2013/062209, filed on Sep. 27, 2013, the entire contents of which is incorporated herein by reference.

FIELD OF THE INVENTION

The invention relates to a reamer with a workpiece-side and a drive-side axial end, a shank made of steel for mounting in a drive shaft, and circumferentially spaced-apart cutting ribs.

BACKGROUND OF THE INVENTION

Reamers made of steel should on the one hand have a long service life and on the other hand be cost-effective.

There are one-piece reamers which consist entirely of steel and have cutting ribs formed on the workpiece-side end. Moreover, these cutting ribs can also have soldered-on hard-metal cutting edges. These reamers can be reground, something which is increasingly desired by customers.

SUMMARY OF THE INVENTION

The object of the invention is to provide a reamer which can be produced cost-effectively and which allows the customer to have it reground.

This is achieved in the case of a reamer of the initially mentioned type in that a cutting body produced as a separate part and made of a harder material than the shank is provided, which cutting body forms the workpiece-side end of the reamer over the whole outer circumference of the workpiece-side end and which is fastened to the shank.

In the case of the reamer according to the invention, a plurality of strip-like cutting ribs are not fastened as separate bodies to the shank, but a cutting body is provided on which the cutting ribs are formed. This cutting body forms the workpiece-side end of the reamer on the outer circumference, and is thus a one-piece body. The production of this cutting body is overall more favorable than the production of numerous individual cutting ribs. Moreover, the customer has the major advantage when regrinding that he is only to use grinding tools which are suitable for one metal. In the case of the previous reamers, it was necessary to work with two different grinding tools, namely a grinding tool with which the hard-metal cutting ribs were ground, and a second grinding tool for the adjoining region made of steel. This second grinding tool can now be dispensed with since the cutting rib and also the adjoining region are made of the same material. The shank made of steel serves for holding the cutting body and gives the tool the necessary flexibility.

The cutting body preferably has integrally formed cutting ribs.

Moreover, the chip grooves on the cutting body can merge into chip groove run outs on the outer circumference of the shank, with the result that the chips are also guided laterally on the shank in chip grooves. However, regrinding is not absolutely necessary in this region.

The cutting body is preferably soldered on the shank.

The shank has an end face which faces the cutting body and on which the cutting body is soldered with the result that a large contact surface is obtained on the one hand and an easy manufacture of cutting body and shank is made possible on the other hand.

The end face can be completely planar, without extensions or the like. Moreover, however, it is also possible that a centering extension, for example, projects from the end face into a corresponding receptacle in the cutting body, which extension can be cylindrical or conical, for example.

The cutting body can form the workpiece-side end face of the reamer, i.e. form the whole end face.

Irrespective of the exact embodiment of the invention, the cutting body should be a separately prefabricated part which is first fabricated completely and then subsequently is fastened to the shank. Alternatively to this, however, it is also possible, after fastening the cutting body to the shank, to carry out final grinding work on the cutting body, for example to produce coaxlality between the outer circumference and the outer circumference of the shank.

Moreover, there should be provided at least one coolant passage which extends from the shank to the workpiece-side end face of the reamer and opens either there or at the outer circumference.

The shank can have a shoulder, with a larger-diameter section joining the cutting body and a smaller-diameter section to be mounted in the drive shaft.

As a result of the larger section, the shank has a larger surface on which the cutting body can bear at the end and be fastened to the shank.

The coolant passage should emanate from the end face of the shoulder, i.e. from the drive-side end face of the shoulder. Moreover, however, it is also possible to provide a further or an alternative coolant passage which emanates, for example, at the end from the section of smaller diameter and opens on the opposite, workpiece-side end face of the cutting body.

If the coolant passages have sections in the shank and in the cutting body, the shank and cutting body must be aligned circumferentially with respect to one another. This is possible, where appropriate, by means of one or more extensions acting in the circumferential direction and complimentary recesses which are formed on the shank or on the cutting body.

In order to protect the shank from wear, the cutting body can be larger in its outside diameter than the shank.

The preferred embodiment provides that the cutting body is a sintered body, with the result that the cutting ribs are formed at the same time during sintering. The materials used for the cutting body are preferably carbides or cermet.

BRIEF DESCRIPTION OF THE DRAWINGS

Further features and advantages of the invention will emerge from the description below and from the drawings to which reference is made. In the drawings.

DETAILED DESCRIPTION OF THE INVENTION

Figure 1:
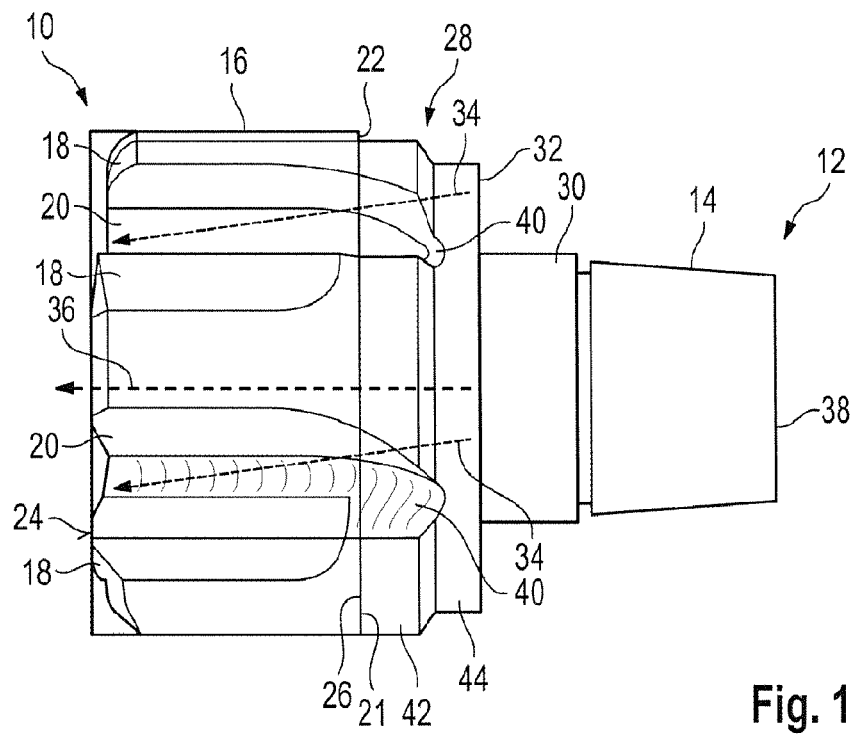
FIG. 1 shows a side view of an embodiment of the reamer according to the invention.

FIG. 1 depicts a reamer which has a workpiece-side end 10 and a drive-side end 12.

The reamer comprises two parts, preferably consists only of two parts, namely a shank 14 and a cutting body 16 fastened to the shank. The shank 14 is made of steel and forms the drive-side end 12.

The cutting body 16 preferably forms alone the workpiece-side end 10 and consists of a hard metal, preferably being a sintered body made of cermet, for example. Alternatively to this, the cutting body consists of carbide.

The cutting body, which has a substantially cylindrical shape, has cutting ribs 18 integrally formed on the outer circumference thereof. At the edge of the cutting ribs 18, chip grooves 20 are formed by depressions in the cutting body 16. The chip grooves 20 extend as far as the shank-side end 21 of the cutting body 16.

The cutting body 16 extends around in a circumferentially enclosed manner at the outer circumference of the reamer in the region of the workpiece-side end, forming, as it were, the outer circumference of the reamer in this section.

The embodiment according to FIG. 1 provides that the cutting body 16 also completely forms the workpiece-side end face 24 of the reamer.

In the embodiment according to FIG. 1, the end face 22 of the cutting bodies 16 that faces the shank 14 and is opposed to the end face 24 is planar and bears with its full surface against an opposite, planar end face 26 of the shank 14. The two end faces 22, 24 form the Single contact faces; here the cutting body 16 is connected to the shank 14, preferably by soldering.

The shank 14 has substantially two sections, namely a larger-diameter section 28 which adjoins the cutting body 16 and a smaller-diameter section 30 which extends toward the drive-side end 12 and which is inserted into the drive shaft of the drive tool. By means of the two cross-sectionally different sections 28, 30 there results a shoulder in the shank 14 with an end face 32 which faces the drive-side end 12.

From the end face 32 there can emanate one or more coolant passages 34, symbolized by arrows represented with interrupted lines, which extend through the shank and through corresponding passages in the cutting body 16 to the end face 24 and open there. Alternatively or in addition, it would also be possible for coolant passages to end on the circumferential wall of the cutting body 16.

Alternatively or in addition, a central coolant passage can also be provided which extends, for example, along the center axis of the reamer and emanates from the end 38 of the section 30.

As can be seen from FIG. 1, the cutting body 16 has a larger outside diameter than the section 28 of the shank 14, the outside diameter of the cutting body 16 being measured at the radially outermost point of the respective cutting ribs 18.

The chip grooves 20 in the cutting body 16 merge into chip groove run outs 40 in the section 28 and run out therein.

The outflow of chips can be further improved if the section 28, as shown in FIG. 1, is again subdivided into two sub sections 42, 44 provided with different diameters, wherein the smaller-diameter sub section 44 lies closer to the drive-side end 12, with the result that the chip groove run outs 40 open in the sub section 44, i.e. a groove is no longer present there, and the chips are no longer guided in grooves in this region but can "flow out" freely.

The embodiment according to FIG. 2 corresponds substantially to that in FIG. 1, and therefore only the differences will be discussed below, and the parts, surfaces or sections already introduced up to this point will also retain their reference signs in FIG. 2.

Figure 2:
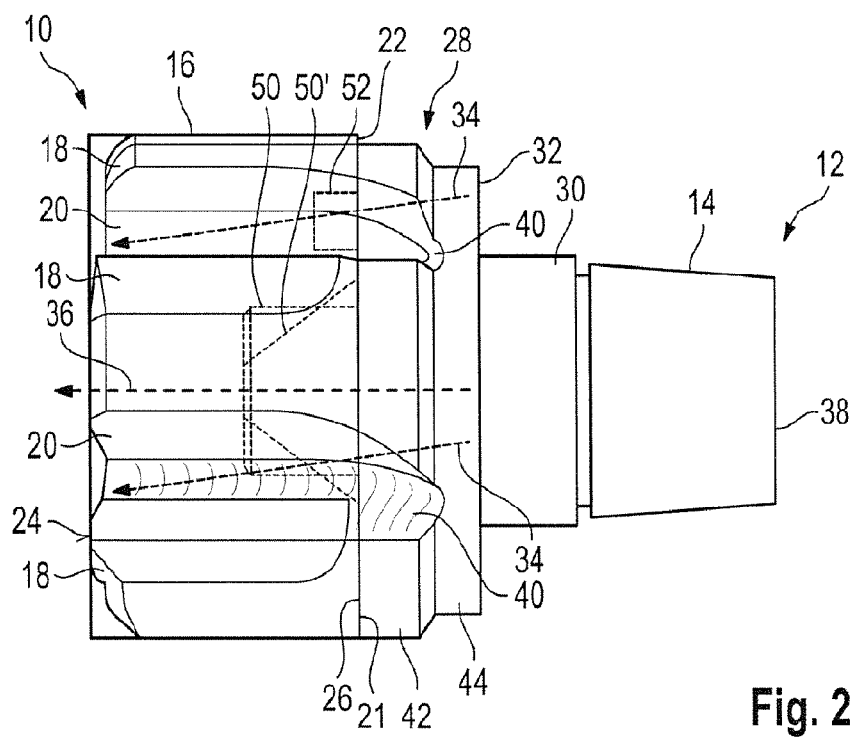
FIG. 2 shows a side view of the reamer according to the invention according to a second embodiment.

Whereas in the embodiment according to FIG. 1 the two end faces 22, 26 of the cutting body 16 or of the shank 14 were completely planar, in the embodiment according to FIG. 2 a centering mandrel 50 is provided on the shank 14, which mandrel projects from the end face 26 and protrudes into a complimentarily formed recess in the cutting body 16.

The centering mandrel 50 can extend partially into the interior of the cutting body 16, i.e. not extend as far as the end face 24 and form a part thereof. In this embodiment, the cutting body 16 will then be embodied as a ring.

The centering mandrel 50 can be cylindrical or conical, as shown in each case with interrupted lines. The conical centering mandrel bears the reference sign 50'.

In order to achieve a circumferential alignment of cutting body 16 and shank 14, a positive-locking connection is additionally optionally provided in the circumferential direction between cutting body 16 and shank 14, namely, for example, by means of an eccentric extension 52 on the end face 26, which extension penetrates into a complimentary opening in the cutting body 16. This circumferential alignment can of course also be provided in the embodiment according to FIG. 1.

The cutting body 16 is preferably completely prefabricated before it is fastened to the shank 14. This means that, according to an embodiment of the invention which is not intended to be understood as limiting, the cutting ribs 18 are also already completely produced before the cutting body 16 is mounted on the shank 14.

The reamer can be readily reground, with different grinding tools not required here since the cutting ribs 18 are formed exclusively in the cutting body 16.

It is, if appropriate, also possible, after a number of grinding operations, to separate the cutting body 16 from the shank 14 and to refit a new cutting body 16 on the already used shank 14.

What is claimed is:

1. A reamer with a workpiece-side axial end and a drive-side axial end, said reamer comprising:
   a shank made of steel for mounting in a drive shaft;
   circumferentially spaced-apart cutting ribs; and
   a cutting body produced as a separate part from the shank and made of a harder material than the shank;
   wherein the cutting body forms the workpiece-side end of the reamer over an entire outer circumference of the workpiece-side end, and is fastened to the shank via soldering at a single contact face between the cutting body and the shank;
   the cutting ribs being integrally formed with respect to the cutting body, wherein all the cutting ribs are formed only on the cutting body;
   the cutting body comprising chip grooves, wherein each chip groove is disposed adjacent to and between two of the cutting ribs;
   the shank comprising chip groove run outs recessed into an outer circumference of the shank;
   the chip grooves on the cutting body merging directly into the chip groove run outs on the outer circumference of the shank;
   the cutting body comprising a region with the largest outside diameter of the reamer, and having a larger outside diameter than the shank;
   the shank comprising:
   a first, larger-diameter section adjacent to and adjoining the cutting body;
   a second, smaller-diameter section for being mounted in the drive shaft, the second section extending axially away from the first section; and
   a shoulder where the first section adjoins the second section, the shoulder resulting from different diameters between the first and second sections;

the first section of the shank comprising:
    a first, larger-diameter sub-section adjacent to and adjoining the cutting body; and
    a second, smaller-diameter sub-section extending axially away from the first sub-section to the shoulder;
    wherein the chip groove run outs extend through the first sub-section and open out in the second sub-section.

2. The reamer as claimed in claim 1, wherein the shank has an end face which faces the cutting body and on which the cutting body is soldered.

3. The reamer as claimed in claim 1, wherein the cutting body forms the workpiece-side end face of the reamer.

4. The reamer as claimed in claim 1, further comprising at least one coolant passage extending from the shank to the workpiece-side end face of the reamer.

5. The reamer as claimed in claim 4, wherein the at least one coolant passage emanates from an end face formed by the shoulder.

6. The reamer as claimed in claim 1, wherein the cutting body is a sintered body made of cermet, or of carbide.

7. The reamer as claimed in claim 4, wherein:
    the shank includes an end face which faces the cutting body; and
    the at least one coolant passage opens at the end face.

8. The reamer as claimed in claim 1, wherein:
    the cutting body and shank each comprise an end face;
    the end face of the cutting body engaging the end face of the shank at the single contact face between the cutting body and the shank.

9. The reamer as claimed in claim 8, wherein the end face of the cutting body and the end face of the shank are both completely planar.

10. The reamer as claimed in claim 8, wherein:
    the cutting body comprises an internal recess extending from the end face of the cutting body; and
    the shank comprises a mandrel which extends from the end face of the shank and protrudes into recess of the cutting body.

11. The reamer as claimed in claim 1, wherein the largest outside diameter of the reamer is measured at a radially outermost point of the cutting ribs.

* * * * *